US008392923B2

(12) United States Patent
Walters

(10) Patent No.: US 8,392,923 B2
(45) Date of Patent: Mar. 5, 2013

(54) DYNAMIC POLLING FOR COMPLETION OF ASYNCHRONOUS TASKS BASED ON HISTORICAL TASK COMPLETION TIMES

(75) Inventor: Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 1233 days.

(21) Appl. No.: 11/864,432

(22) Filed: Sep. 28, 2007

(65) Prior Publication Data

US 2009/0089784 A1 Apr. 2, 2009

(51) Int. Cl.
*G06F 9/46* (2006.01)
*G06F 9/54* (2006.01)
*G06F 15/18* (2006.01)

(52) U.S. Cl. ............................ 718/102; 718/100; 709/224

(58) Field of Classification Search .................. 718/100, 718/101, 102, 105; 709/223, 224
See application file for complete search history.

(56) References Cited

U.S. PATENT DOCUMENTS

| | | | | |
|---|---|---|---|---|
| 5,566,351 A | * | 10/1996 | Crittenden et al. | 710/46 |
| 5,918,219 A | * | 6/1999 | Isherwood | 705/37 |
| 6,173,323 B1 | * | 1/2001 | Moghe | 709/224 |
| 6,453,268 B1 | * | 9/2002 | Carney et al. | 702/186 |
| 6,601,035 B1 | * | 7/2003 | Panagos et al. | 705/7.22 |
| 6,694,009 B1 | * | 2/2004 | Anderson et al. | 379/266.06 |
| 6,898,751 B2 | * | 5/2005 | Aikawa et al. | 714/748 |
| 7,085,256 B2 | * | 8/2006 | Ware et al. | 370/347 |
| 2002/0174214 A1 | * | 11/2002 | Carl et al. | 709/224 |
| 2002/0188707 A1 | * | 12/2002 | Terrill | 709/223 |
| 2004/0210632 A1 | * | 10/2004 | Carlson et al. | 709/203 |
| 2006/0190639 A1 | * | 8/2006 | Hwang | 710/52 |
| 2006/0192997 A1 | * | 8/2006 | Matsumoto et al. | 358/1.15 |
| 2007/0223028 A1 | * | 9/2007 | Boyes et al. | 358/1.14 |
| 2007/0294392 A1 | * | 12/2007 | Balasubramanian et al. | 709/224 |

\* cited by examiner

*Primary Examiner* — Jennifer To
*Assistant Examiner* — Benjamin Wu
(74) *Attorney, Agent, or Firm* — Yudell Isidore Ng Russell PLLC

(57) ABSTRACT

A method, system, and computer program product for computing an optimal time interval between polling requests to determine whether an asynchronous operation is completed, in a data processing system. A Polling Request Interval (PRI) utility determines the optimal time interval between successive polling requests, based on historical job completion results. The PRI utility first determines an average job time for previously completed operations. The PRI utility then retrieves a pair of preset configuration parameters including (1) a first parameter which provides the minimum time interval between successive polling requests; and (2) a second parameter which provides the fraction of the average task time added to the first parameter to obtain the time interval between (successive) polling requests. The PRI utility calculates the optimal time between polling requests based on the average job time and the retrieved configuration parameters.

9 Claims, 4 Drawing Sheets

DYNAMIC POLLING FOR COMPLETION OF ASYNCHRONOUS TASKS BASED ON HISTORICAL TASK COMPLETION TIMES

BACKGROUND OF THE INVENTION

1. Technical Field

The present invention generally relates to data processing systems and in particular to polling in data processing (network) systems.

2. Description of the Related Art

Polling of a network host (or resource) is necessary to determine when an asynchronous job has completed. As an example, the IBM CommonStore™ application archives mail from the Lotus Domino™ and Microsoft Exchange® mail servers to an IBM Content Manager repository. In the case of Domino (similarly with Exchange), mail archiving is accomplished by creating a new document in a jobs Database with the parameters of the archive request (the Domino Universal ID of the document, the server, archive options, etc.).

The CommonStore task monitors the jobs database for new documents. When new documents are found, the CommonStore task processes the request. Processing of the request involves moving the contents of the mail document to Content Manager and then changing the status of the job document to "COMPLETE". A client task which depends upon the completion status of this archive operation would have to continually retrieve the job document to check the state, waiting for the state to change to COMPLETE. Obviously, if the client task constantly requests a document that has not had a status change, the client task monopolizes the client CPU and creates significant load on the Domino server.

A well-known solution is to have the client task "sleep" for a certain amount of time between polling requests. "Sleep" may be defined as the interval of time between successive polling requests. However, a client task which sleeps too long between checks of the job state is unable to act as quickly as a client task with a shorter sleep interval. The client task with the shorter sleep interval may be able to provide a quicker response to the positive result (of a job "COMPLETE" status). In a worst case example, the job state changes to COMPLETE immediately after the client task checks the job state, but the client task remains unaware of the COMPLETE state until the task sleeps one more time before checking the state again. Thus, if the client task attempts to time the execution of the archive operation, and the task sleeps for one second, for example, between polling requests, the client task's timing result may be assumed to be overestimated by anywhere in the range from 0 to 1 second. When the client task sleeps for too short an interval, the client task wastes processor (CPU) time on the client and the server, similar to the above described case (of an extreme condition) of not sleeping at all.

SUMMARY OF THE EMBODIMENTS

Disclosed are a method, system, and computer program product for computing an optimal time interval between polling requests to determine whether an asynchronous operation is completed, in a data processing system. A Polling Request Interval (PRI) utility determines the optimal time interval between successive polling requests, based on historical job completion results. The PRI utility first determines an average job time for previously completed operations. The PRI utility then retrieves a pair of preset configuration parameters including (1) a first parameter which provides the minimum time interval between successive polling requests; and (2) a second parameter which provides the fraction of the average task time added to the first parameter to obtain the time interval between (successive) polling requests. The PRI utility calculates the optimal time between polling requests based on the average job time and the retrieved configuration parameters.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
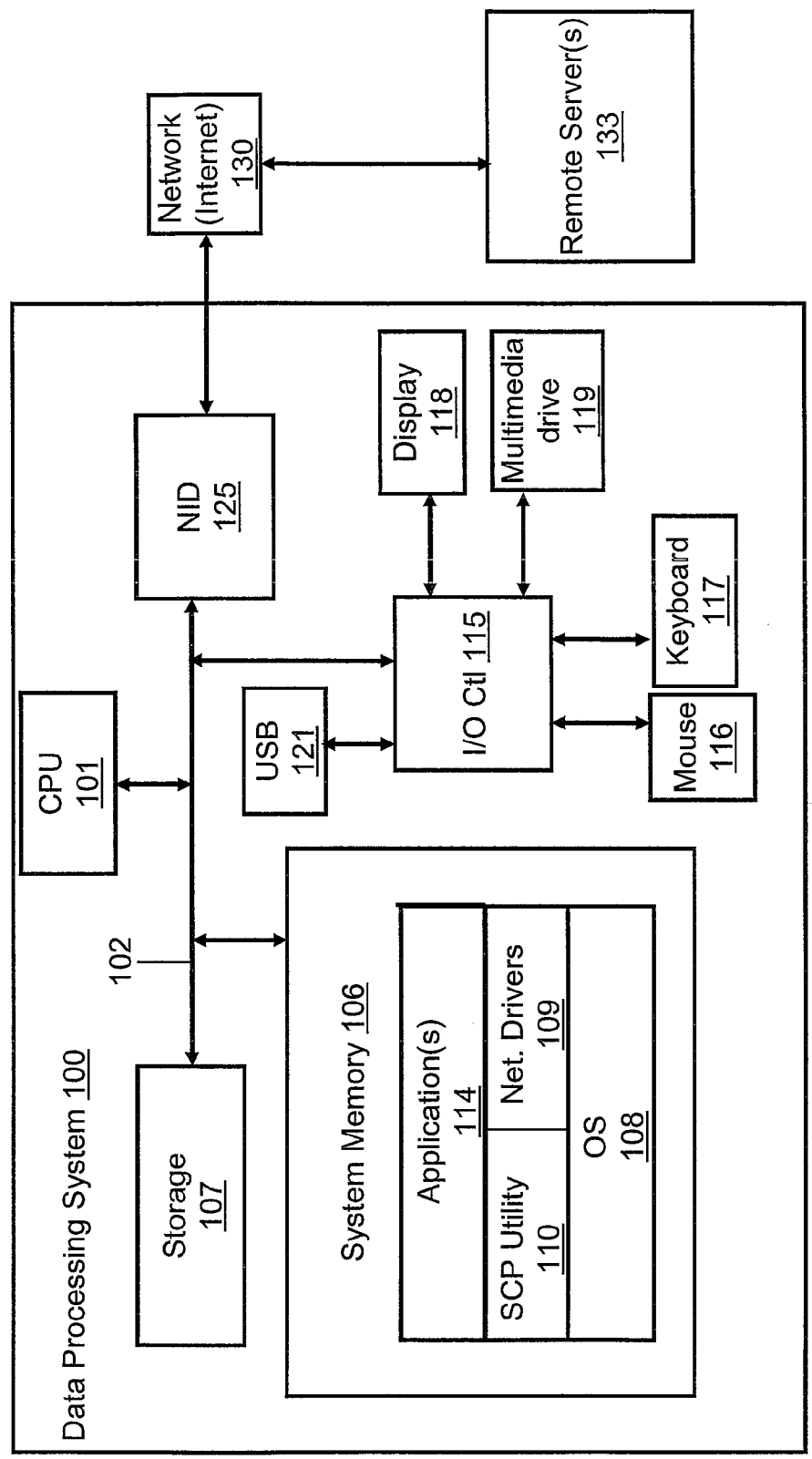
FIG. 1 is a block diagram representation of a data processing system, according to one embodiment of the invention.

The illustrative embodiments provide a method, system, and computer program product for computing an optimal time interval between polling requests to determine whether an asynchronous operation is completed, in a data processing system. A Polling Request Interval (PRI) utility determines the optimal time interval between successive polling requests, based on historical job completion results. The PRI utility first determines an average job time for previously completed operations. The PRI utility then retrieves the following preset configuration parameters: (1) a MIN_POLL_SLEEP, which provides the minimum time interval between successive polling requests; and (2) a POLL_SLEEP_FACTOR, which provides the fraction of the average task time added to MIN_POLL_SLEEP to obtain the time interval between (successive) polling requests. The PRI utility calculates the time between polling requests (POLL_SLEEP) based on the average job time and the retrieved configuration parameters, by the following equation:

$$POLL\_SLEEP = (POLL\_SLEEP\_FACTOR * average\ task\ time) + MIN\_POLL\_SLEEP.$$

Thus, sleep time is based, in part, on how long the operation is expected to take.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the terms "sleep interval", "polling request interval" and "POLL_SLEEP" are equivalent parameters and all refer to the time interval between successive polling requests.

With reference now to FIG. 1, there is depicted a block diagram representation of a data processing system (and connected network). DPS 100 comprises at least one processor or central processing unit (CPU) 101 connected to system memory 106 via system interconnect/bus 102. Also connected to system bus 102 is I/O controller 115, which provides connectivity and control for input devices, of which pointing device (or mouse) 116 and keyboard 117 are illustrated, and output devices, of which display 118 is illustrated. Additionally, a multimedia drive 119 (e.g., CDRW or DVD drive) and USB (universal serial bus) hub 121 are illustrated, coupled to I/O controller. Multimedia drive 119 and USB hub 121 may operate as both input and output (storage) mechanisms. DPS 100 also comprises storage 107, within which data/instructions/code may be stored.

DPS 100 is also illustrated with a network interface device (NID) 125, with which DPS 100 connects to one or more servers 133 via an access network, such as the Internet 130. In the described embodiments, Internet 130 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software (or firmware) code or logic stored within memory 106 or other storage (e.g., storage 107) and executed by CPU 101. Thus, illustrated within memory 106 are a number of software/firmware components, including operating system (OS) 108 (e.g., Microsoft Windows®, a trademark of Microsoft Corp, or GNU®/Linux®, registered trademarks of the Free Software Foundation and The Linux Mark Institute), applications 114, and polling request interval (PRI) utility 110. In actual implementation, certain features of OS 108 and PRI utility 110 may be combined as a single utility collectively providing the various functions of each individual software component when the corresponding code is executed by the CPU 101. For simplicity, PRI utility 110 is illustrated and described as a stand alone or separate software/firmware component, which provides specific functions, as described below.

Among the software code/instructions provided by PRI utility 110, and which are specific to the invention, are: (a) code for computing an optimal time interval between polling requests to determine whether an asynchronous operation is completed; (b) code for calculating an average job time for previously completed operations; and (c) code for applying a set of preset configuration parameters within an equation utilized to calculate the optimal time interval between polling requests. For simplicity of the description, the collective body of code that enables these various features is referred to herein as PRI utility 110. According to the illustrative embodiment, when CPU 101 executes PRI utility 110, DPS 100 initiates a series of functional processes that enable the above functional features as well as additional features/functionality, which are described below within the description of FIGS. 2-4.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
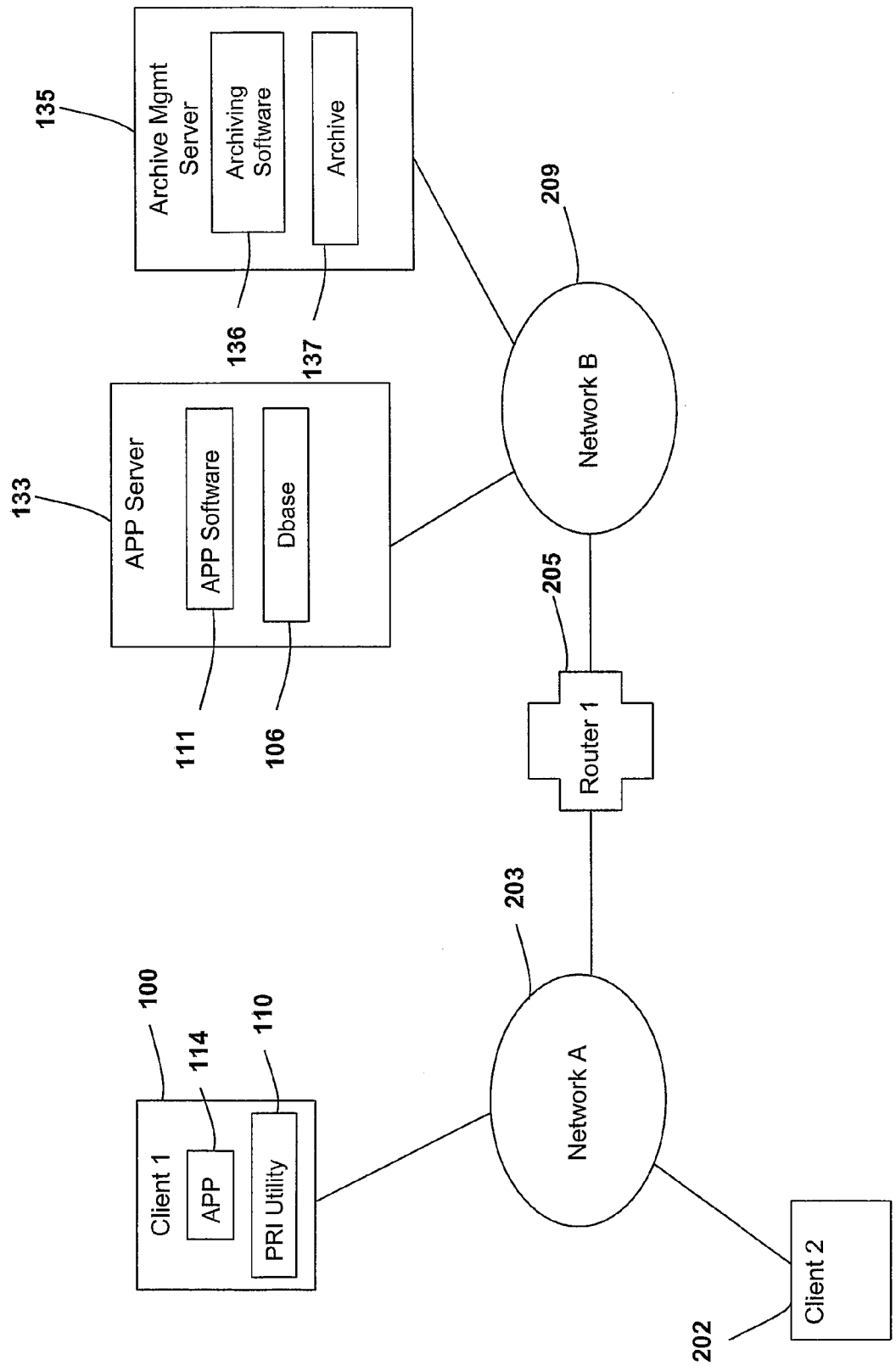
FIG. 2 illustrates a network, in which a client runs an application hosted by a server and sends polling requests to the server in order to archive application data, in accordance with one embodiment of the invention.

With reference now to FIG. 2, a network is illustrated in which a client runs an application hosted by a server and sends polling requests to the server in order to archive application data, is illustrated, according to an illustrative embodiment of the present invention. Network 200 comprises client 1 100 and client 2 202 which both connect to network A 203. Client 1 100 comprises APP 114 and PRI utility 110. Network 200 also comprise network B 209, which is connected to network A 203 via router 1 205. Connected to network B 209 is APP server 133. APP server 133 and Archive Management Server (AMS) 135 are both connected to network B 209. APP server 133 comprises APP software 111 and Database (Dbase) 112. AMS 135 comprises Archiving Software 136 and Archive 137.

In network 200, APP 114 may represent a Lotus Domino™ mail application or a Microsoft Exchange® mail application, for example. Thus, APP server 133 may represent a Lotus Domino™ server or a Microsoft Exchange® mail server, for example. Consequently, APP software 111 may represent the Lotus Domino™ server software or the Microsoft Exchange® mail server software. Archiving software 136 may represent the IBM CommonStore™ Application. IBM CommonStore for Lotus Domino™ (CSLD) and IBM CommonStore™ for Exchange Server (CSX) are the message archival and retention management products for Lotus Domino™ and Microsoft® Exchange to manage the growth of e-mail systems. The IBM CommonStore™ application archives mail from the Lotus Domino™ and Microsoft Exchange® mail servers to an IBM Content Manager repository which may be represented by archive 137.

In network 200, client 1 100 sends a regular polling request at an optimal timing frequency to APP server 133 in order to execute archive operations. A calculation to determine the frequency of the polling requests generates an optimal value for the frequency (of the polling requests), which value provides the submission interval of polling requests. Polling requests having the optimal submission interval allows efficient processing of the requests in order to minimize the demands on the client's CPU. Additionally, submitting polling requests at the optimal interval avoids placing a significant load on APP server 133.

PRI utility 110 allows client 1 100 to achieve the optimal polling request interval. PRI utility 110 calculates the time between polling requests based on the average job time of the (previously) completed tasks and a set of configuration parameters. Operations that take a very long time have a relatively long sleep time between polling, and operations which are completed quickly have a relatively short sleep time. The sleep time is based, in part, on the length of time the operation is expected to take. An example demonstrating the calculation of the optimal polling request interval is illustrated in FIG. 3.

Figure 3:
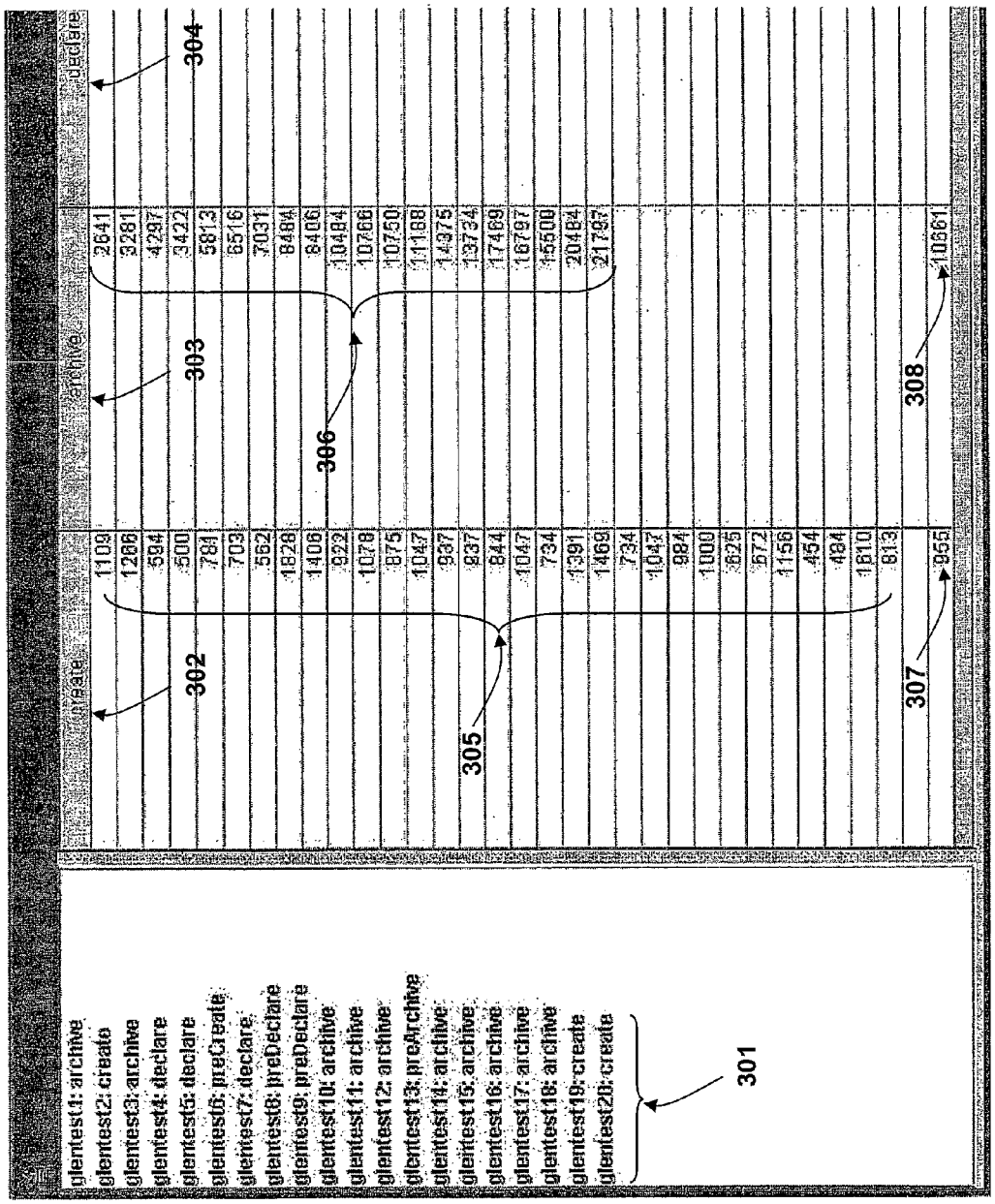
FIG. 3 is a table segment illustrating a performance test application for a solution containing several software applications, according to one embodiment of the invention.

FIG. 3 is a table segment illustrating a (example) performance test application for a solution containing several IBM software applications (Lotus Domino™, CommonStore™, Content Manager, Records Manager), according to one embodiment of the invention. Table 300 comprises a list of twenty (20) threads illustrated by threads 301. Table 300 also comprises three lists of operations: (1) create (illustrated by create 302); (2) archive (illustrated by archive 303); and declare (illustrated by archive 304). The various times taken to complete the create operation are collectively illustrated by create timing entries (CTE) 305. The various times taken to complete the archive operation are collectively illustrated by archive timing entries (ATE) 306. The declare timing entries, which result from a synchronous (declare) operation (which do not require polling), are not shown in Table 300. Create timing average (CTA) 307 is the average of create timing entries (CTE) 305. Archive timing average (ATA) 308 is the average of archive timing entries (ATE) 306.

Each of the 20 threads in threads 301 is running through three sequential operations: create (send a Lotus Notes document), archive (a CommonStore archive operation to move the document to Content Manager), and declare (create a Records Manager record object associated with the Content Manager Item). Of interest to the present invention are the asynchronous operations, create and archive (declare is a synchronous operation). For the create operation, a Lotus Notes document is created on a source database and sent to a target database. The operation is complete when the document arrives at the target database. To determine whether the create operation is completed, the target database is polled using the original document's Universal ID. The polling request fails until the Domino server delivers the document.

Table 300 reveals that the create operation takes, on the average, 955 milliseconds as illustrated by CTA 307. The archive operation is described as follows: create a CommonStore job document and query the document's job-state property until the job is completed. Table 300 reveals that the archive operation takes, on the average, 10661 milliseconds as illustrated by ATA 308. As may be discerned from Table 300, the archive results (values) are increasing quite rapidly, and with an increasing number of request threads, a much more dramatic difference between the create and archive results may be observed.

According to one embodiment, the performance test application has two configuration parameters: MIN_POLL_SLEEP and POLL_SLEEP_FACTOR. In this example, these parameters are set to 100 and 0.1 respectively. MIN_POLL_SLEEP is the minimum amount of time to sleep between requests, i.e., the time interval between successive requests. POLL_SLEEP_FACTOR is the percentage (or fraction) of the average task time which is added to MIN_POLL_SLEEP to determine the actual sleep time.

For the create operation, the polling interval is calculated by the following equation:

POLL_SLEEP=(POLL_SLEEP_FACTOR*average task time)+MIN_POLL_SLEEP.

One skilled in the art may easily compute the polling intervals with the above equation. Thus, for the performance test application, polling for the create task sleeps approximately 196 milliseconds between requests and polling for the archive task sleeps approximately 1166 milliseconds between requests.

Figure 4:
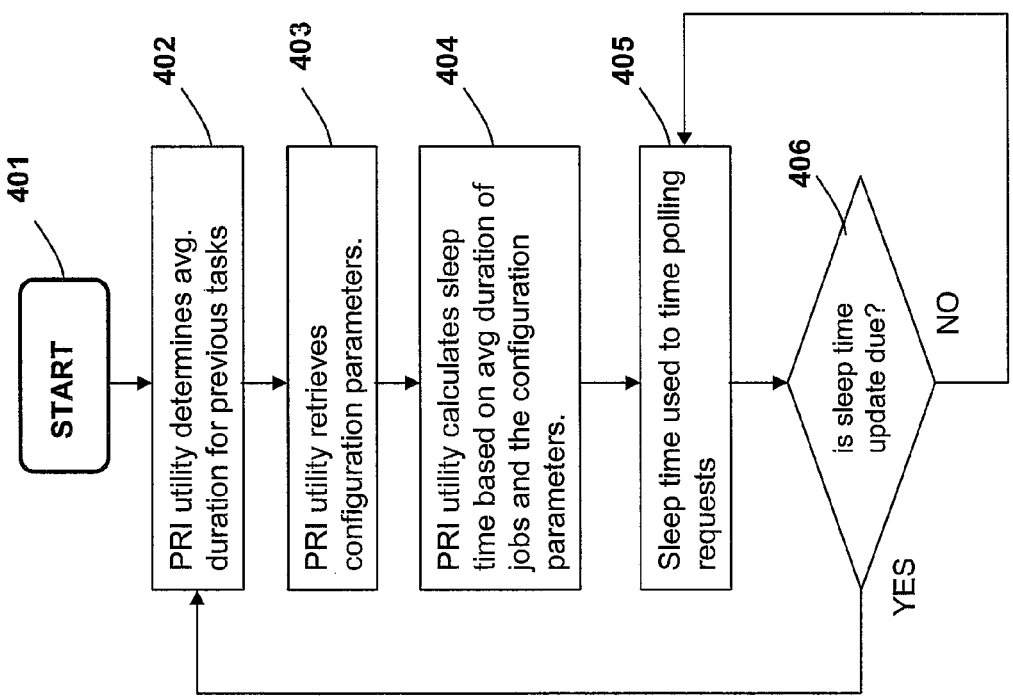
FIG. 4 is a flow chart illustrating the process of determining the optimal polling request time interval, in accordance with one embodiment of the invention.

FIG. 4 is a flow chart illustrating a method by which the above processes of the illustrative embodiments are completed. Although the methods illustrated in FIG. 4 may be described with reference to components shown in FIGS. 1-3, it should be understood that this is merely for convenience and alternative components and/or configurations thereof can be employed when implementing the various methods. Key portions of the methods may be completed by PRI utility 110 executing within DPS 100 (FIG. 1) and controlling specific operations of/on DPS 100, and the methods are thus described from the perspective of either/both PRI utility 110 and DPS 100.

The process of FIG. 4 begins at initiator block 401 and proceeds to block 402, at which PRI utility 110 determines an average job time for previously completed tasks. At block 403, PRI utility 110 then retrieves the following configuration parameters: (1) a MIN_POLL_SLEEP, which is the minimum time interval between successive polling requests; and (2) a POLL_SLEEP_FACTOR, which is the fraction of the average task time to add to MIN_POLL_SLEEP to obtain POLL_SLEEP, the time interval between successive polling requests. In one embodiment, the configuration parameters are derived from analyses of historical job completion data. The configuration parameters are suitably chosen to prevent (in a majority of cases), when factored into the equation for calculating the optimal polling interval, the client task from sleeping too long or for too short an interval. PRI utility 110 calculates the sleep time, i.e., the time interval between successive polling requests, based on the calculated average and the retrieved configuration parameters, as shown at block 404. The calculated polling request interval is used to time when subsequent polling requests are issued, as shown at block 405. At decision block 406, PRI utility 110 determines whether a calculation to yield an updated (i.e., more efficient/optimized) sleep time value is required. The sleep time value may require updating based on one or more of the following factors: (1) a preset interval; (2) a threshold number of tasks completed since the last calculation; (3) a variance of the job completion times; and (4) a required update to one or more of the configuration parameters. If at block 406, PRI utility 110 determines that an updated sleep time value is required, the process returns to block 402. If at block 406, PRI utility 110 determines that an updated sleep time value is not required, the process returns to block 405, and the previously calculated sleep time is used for subsequent polling requests.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
retrieving historical data comprising a plurality of data entries each corresponding to a previously completed asynchronous task related to an electronic mail (e-mail) application software, wherein each data entry indicates:
an asynchronous task completion time, and
a type of asynchronous task;
dynamically modifying, by a computer processor, a time period between successive polling requests for a specific type of asynchronous task by:
identifying a set of asynchronous tasks of the specific type from the historical data;
calculating an average completion time using the asynchronous task completion time for each of the asynchronous tasks of the set of asynchronous tasks by calculating a ratio of a sum of the asynchronous task completion time for each of the asynchronous tasks of the set of asynchronous tasks to the number of asynchronous tasks in the set of asynchronous tasks, wherein calculating the average completion time comprises using a weighted average computation, in which greater weight is given to the asynchronous task completion time for asynchronous tasks most recently completed;
retrieving a set of preset configuration parameters including:
a first parameter, which provides a minimum time interval between successive polling requests; and
a second parameter, which provides a percentage to be applied to the average completion time; and
calculating a time interval between successive polling requests for the specific type of asynchronous task as a sum of the first parameter and a result of the second parameter multiplied by the average completion time; and
issuing a next polling request for an asynchronous task of the specific type of asynchronous task at a time determined by the calculated time interval between successive polling requests.

2. The method of claim 1 further comprising:
updating a calculation of the time interval between successive polling requests based on one or more factors from among:
a preset interval;
a threshold number of asynchronous tasks completed since a last calculation;
a variance of asynchronous task completion times; and
an update to one or more configuration parameters.

3. The method of claim 1, wherein identifying the set of asynchronous tasks of the specific type from the historical data comprises identifying asynchronous tasks of the specific type of a pre-set number of asynchronous tasks most recently completed.

4. A data processing system comprising:
a processor which executes an electronic mail software;
a memory system which stores the electronic mail software;
a mechanism for connecting the data processing system to one or more server systems;
a utility executing on the processor and which causes the processor to:
retrieve historical data comprising a plurality of data entries each corresponding to a previous completed asynchronous task related to the electronic mail software, wherein each data entry indicates:
an asynchronous task completion time, and
a type of asynchronous task;
dynamically modify a time period between successive polling requests for a specific type of asynchronous task by:
identifying a set of asynchronous tasks of the specific type from the historical data;
calculating an average completion time using the asynchronous task completion time for each of the asynchronous tasks of the set of asynchronous tasks by a ratio of a sum of the asynchronous task completion time for each of the asynchronous tasks of the set of asynchronous tasks to the number of asynchronous tasks in the set of asynchronous tasks, wherein calculating the average completion time comprises using a weighted average computation, in which greater weight is given to the asynchronous task completion time for asynchronous tasks most recently completed;
retrieving a set of preset configuration parameters including:

a first parameter, which provides a minimum time interval between successive polling requests; and a second parameter, which provides a percentage to be applied to the average completion time; and calculating a time interval between successive polling requests for the specific type of asynchronous task as a sum of the first parameter and a result of the second parameter multiplied by the average completion time; and issue a next polling request for an asynchronous task of the specific type of asynchronous task at a time determined by the calculated time interval between successive polling requests.

5. The system of claim 4, wherein said utility further causes the processor to:

update a calculation of the time interval between successive polling requests based on one or more factors from among:

a preset interval;

a threshold number of asynchronous tasks completed since a last calculation;

a variance of asynchronous task completion times; and an update to one or more configuration parameters.

6. The system of claim 4, wherein identifying the set of asynchronous tasks of the specific type from the historical data comprises identifying asynchronous tasks of the specific type of a pre-set number of asynchronous tasks most recently completed.

7. A computer program product comprising:

a non-transitory computer readable storage medium; and program code on said computer readable storage medium that, when executed within a data communication device generating application data via a network having at least one client data communication device, said program code provides the functionality of:

retrieving historical data comprising a plurality of data entries each corresponding to a previously completed asynchronous task related to an electronic mail (e-mail) application software, wherein each data entry indicates:

an asynchronous task completion time, and a type of asynchronous task;

dynamically modifying, by a computer processor, a time period between successive polling requests for a specific type of asynchronous task by:

identifying a set of asynchronous tasks of the specific type from the historical data;

calculating an average completion time using the asynchronous task completion time for each of the asynchronous tasks of the set of asynchronous tasks by calculating a ratio of a sum of the asynchronous task completion time for each of the asynchronous tasks of the set of asynchronous tasks to the number of asynchronous tasks in the set of asynchronous tasks, wherein calculating the average completion time comprises using a weighted average computation, in which greater weight is given to the asynchronous task completion time for asynchronous tasks most recently completed;

retrieving a set of preset configuration parameters including:

a first parameter, which provides a minimum time interval between successive polling requests; and a second parameter, which provides a percentage to be applied to the average completion time; and calculating a time interval between successive polling requests for the specific type of asynchronous task as a sum of the first parameter and a result of the second parameter multiplied by the average completion time; and issuing a next polling request for an asynchronous task of the specific type of asynchronous task at a time determined by the calculated time interval between successive polling requests.

8. The computer program product of claim 7, further comprising code for:

updating the calculation of the time interval between successive polling requests based on one or more of the following factors:

a preset interval;

a threshold number of asynchronous tasks completed since a last calculation;

a variance of asynchronous task completion times; and an update to one or more configuration parameters.

9. The computer program product of claim 7, wherein the program code for identifying the set of asynchronous tasks of the specific type from the historical data comprises program code for identifying asynchronous tasks of the specific type of a pre-set number of asynchronous tasks most recently completed.

* * * * *